J. HOWARD.
HAY STACKER.
APPLICATION FILED AUG. 1, 1910.
1,006,850.
Patented Oct. 24, 1911.
4 SHEETS—SHEET 2.
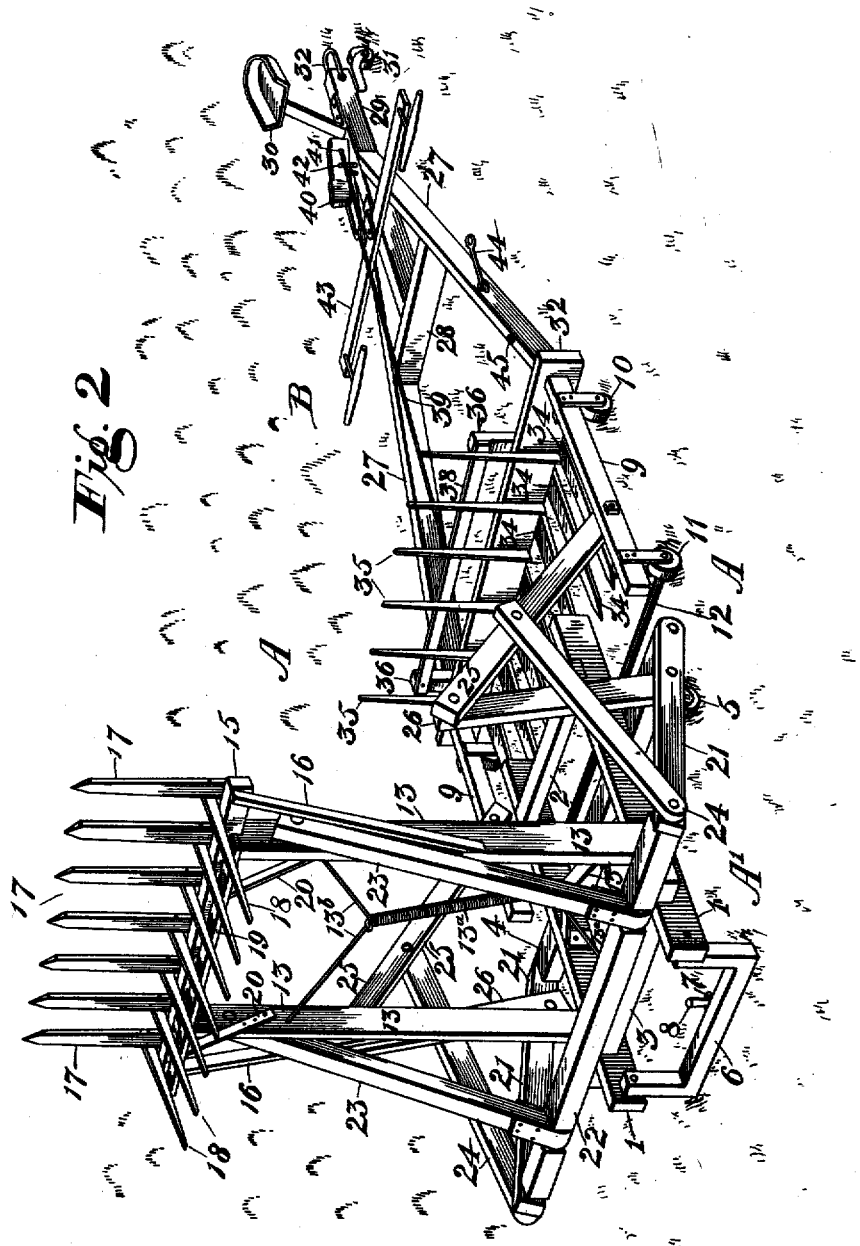
WITNESSES
W. F. Doyle
E. E. Overholt
INVENTOR
John Howard
BY 
Attorney

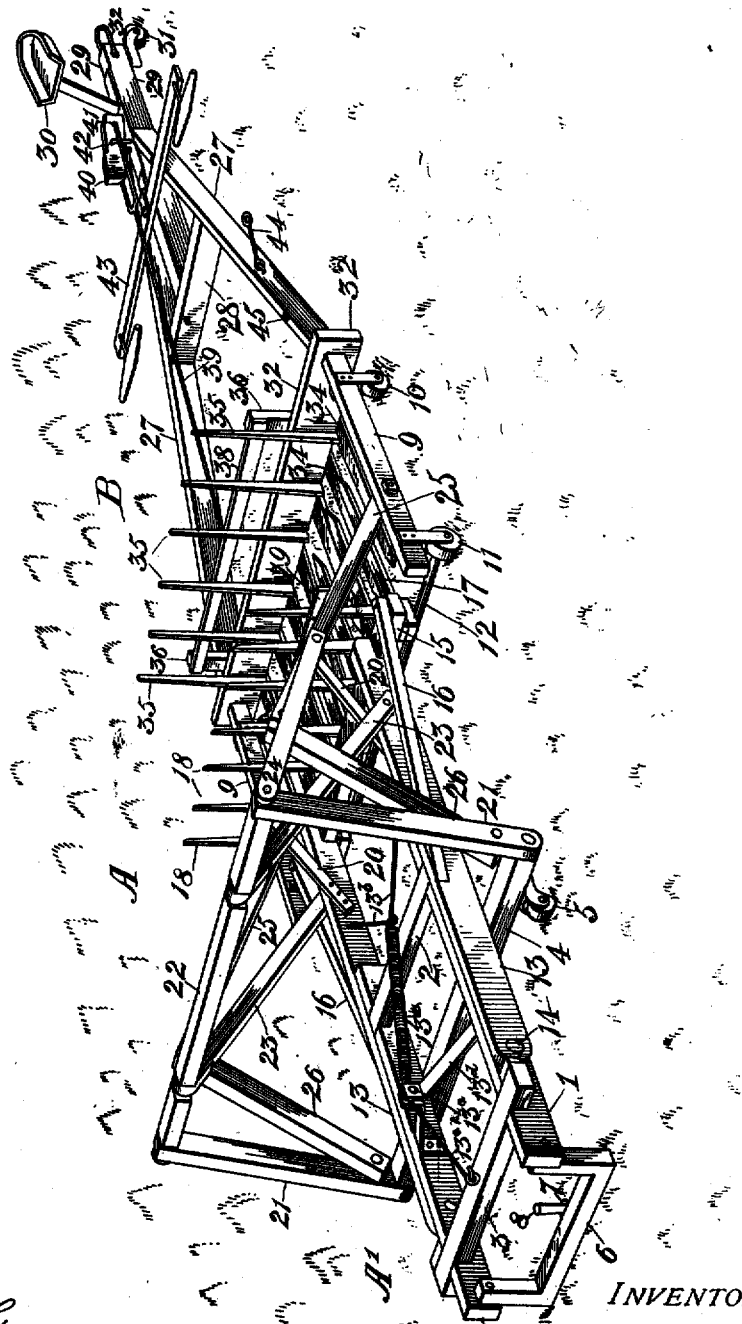

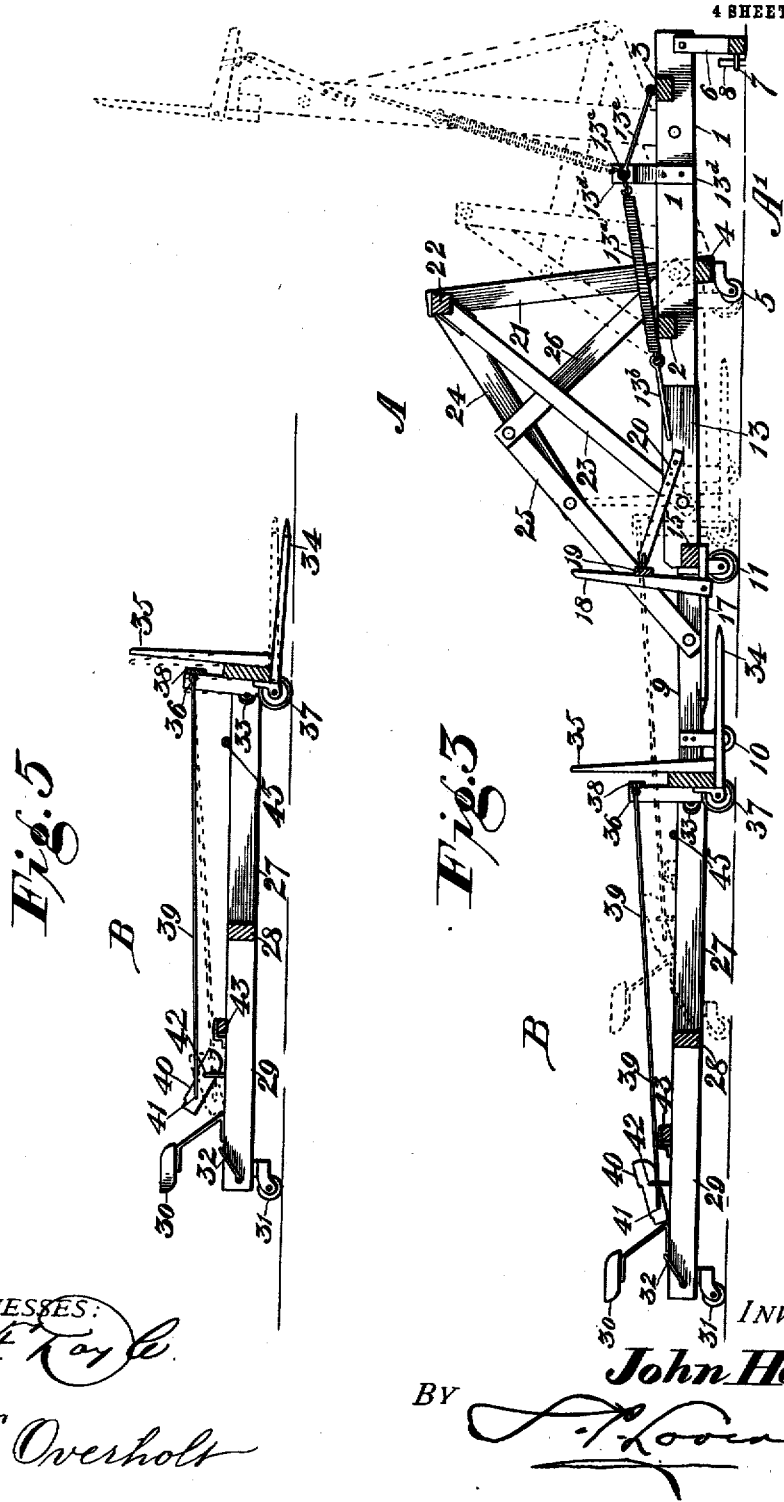

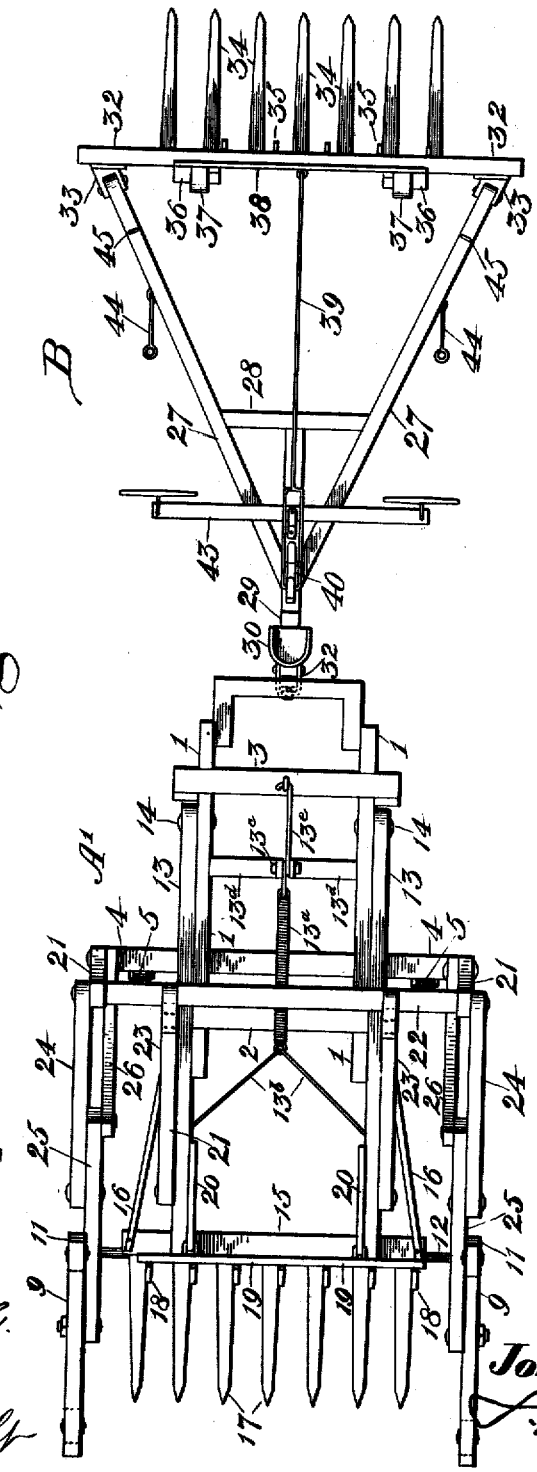

UNITED STATES PATENT OFFICE.

JOHN HOWARD, OF ALBION, NEBRASKA, ASSIGNOR OF ONE-FOURTH TO ANTHONY J. RUDDY AND ONE-FOURTH TO J. P. SHIRLEY, BOTH OF ALBION, NEBRASKA.

HAY-STACKER.

1,006,850.  Specification of Letters Patent.  Patented Oct. 24, 1911.

Application filed August 1, 1910. Serial No. 574,925.

*To all whom it may concern:*

Be it known that I, JOHN HOWARD, a citizen of the United States, residing at Albion, in the county of Boone and State of Nebraska, have invented certain new and useful Improvements in Hay-Stackers, of which the following is a specification.

My invention relates to hay stackers.

My object is to provide a device of this character so constructed that the team and sweep employed for gathering the hay from the field and conveying it to the stack can also be conveniently utilized to elevate the hay and dump it onto the stack, thereby avoiding the use of a second horse and driver for this latter purpose.

Another object is to provide a device of this character having an elevator so constructed that it shall be free from ropes and pulleys, both of which are specially objectionable on machinery of this character as will be pointed out farther on.

A still further object is to provide a device of this kind so constructed that the elevator can be quickly and conveniently engaged by the hay collector or sweep and easily moved to any other part of the field, where it may be desired to again use it, without unhitching the horses from the sweep.

Other objects will appear in the subjoined description.

The invention consists in certain novel constructions and combinations of parts, and in the correlation to each other of certain parts adapted to also work independently of each other, as will be hereinafter described and claimed, reference being had to the accompanying drawings.

One important feature of the invention, and a feature which, so far as I am aware, is entirely new in the art, consists of a pivoted fork designed to stand by the stack, and provided with operating mechanism adapting the fork to be operated by the sweep coming into abutting engagement with said mechanism and pushing the same toward the fork.

Another noticeable feature of my construction is the entire absence of ropes and pulleys, which have heretofore been employed universally with machines of this class, but both of which are specially objectionable on machinery which has to be used out of doors where it is exposed to the weather. Moreover, ropes are not only easily rotted by the weather, but are also more or less constantly liable to breakage from rapid wear and from defects in the material from which they are made; while pulleys wear out rapidly and work loose in their bearings on this kind of machinery because of the great difficulty in keeping them properly oiled.

Referring to the drawings,—Figure 1 is a perspective view of my device showing the parts in the position they occupy just as the sweep engages the hay elevator to operate it. Fig. 2 is a perspective showing the position of the parts after the sweep has moved forwardly in engagement with the hay elevator and thereby operated it. Fig. 3 is a vertical longitudinal section of my device, the full lines showing the parts in the position they occupy in Fig. 1, and the dotted lines the position they occupy in Fig. 2. Fig. 4 is a top plan showing the rear end of the sweep hitched to the hay elevator to move it from one part of the field to another; and Fig. 5 is a longitudinal section through the sweep showing the parts in the position they occupy when the teeth are lowered, the dotted lines showing the position of said parts when the teeth are elevated.

My device is composed of two principal parts—the hay elevator A, and the sweep B. The hay elevator A comprises a main truck $A^1$, an auxiliary truck or carriage $A^2$, a hay crane or fork $A^3$ mounted on the main truck, and operating mechanism connecting the fork with the two trucks.

The frame of the main truck $A^1$ is composed of the parallel side bars 1 connected together by the front and rear cross-bars 2 and 3 respectively. The front end of this frame is supported upon an axle 4 rigidly secured thereto, and projecting outwardly beyond the sides 1 of the frame, and provided near its outer ends with the caster wheels 5. The rear end of the frame $A^1$ is provided with a pivoted crank-link 6 adapted to swing down into engagement with the ground to form a support for the rear end of the truck when the elevator is in operation, and to swing upwardly and be engaged by the rear end of the sweep when it is desired to move the elevator to a different part of the field. The link 6 is provided with an eye-bolt 7 adapted to receive a pin 8 to securely fasten the link to the ground, to hold the main truck A¹ stationary when the elevator is at work. This eye-bolt also forms suitable means for easily hitching to, when it is desired to move the hay elevator.

The auxiliary truck or carriage A² is very light and is composed of the parallel side bars 9 supported on the front and rear pairs of wheels 10 and 11 respectively, with the latter pair of wheels connected together by the rod or axle 12.

The hay crane or elevator fork A³ is composed of the parallel side bars 13, pivoted at their inner ends to the side bars 1 of the main truck by the pivots 14, and rigidly connected together at their outer ends by the transverse bar or head 15, which projects beyond said parallel sides and is provided at its projecting ends with the braces 16. The series of longitudinal tines 17 are rigidly secured to the under side of the crane head 15. The series of dumping tines 18 are pivotally connected at their inner ends to the tines 17, and are rigidly connected at about their centers to the transverse bar 19. This bar is engaged by the adjusting braces 20 by which arrangement the series of dumping tines 18 may be adjusted to any desired angle relatively to the longitudinal tines 17.

The pair of rear rock arms 21 are pivoted at their lower ends to the projecting ends of the axle 4 of the main truck, and at their upper ends to the transverse rock-shaft 22 which they support. The pair of tension links 23 are rotatably connected at their rear ends to the rock-shaft 22 and at their forward ends are pivotally connected to the side bars 13 of the hay fork near the outer ends of said bars; from which construction it will be seen that when the rock-shaft 22 is rocked rearwardly and downwardly, it will operate through the tension links 23 to elevate the hay-crane A³; and in order to thus rock the shaft 22 without ropes or pulleys, which have heretofore been employed for this purpose, I provide the pair of thrust bars or levers 24 which are pivoted at their rear ends to the ends of the rock-shaft 22, and at their forward ends to the pair of thrust bars or levers 25, at a point nearly midway of said levers. These thrust levers 25 are pivoted at their upper ends to the upper ends of the fulcrum links or rock arms 26, and at their lower ends to the side bars 9 of the auxiliary truck or carriage A², at about the middle of said side bars. Said fulcrum links or rock arms 26 are pivotally connected at their lower ends to the rear rock-arms 21 near the axle 4, and if preferred may be connected to said axle instead of to said rock arms. The fork-operating mechanism at either side of my device, may otherwise be briefly described as consisting of the two thrust bars 24 and 25 pivotally connected to each other and mounted at their rear ends on the rock arms 21 and 26 respectively, the latter one of which arms may if desired be pivoted at its lower end to the former. The thrust of the sweep is imparted by the auxiliary carriage to the forward end of the thrust bar 25, and is communicated from this bar 25 to the forward end of the rear thrust bar 24, so that these bars may be said to be mounted at their rear ends on rock arms, and adapted to receive an operating thrust at their forward ends.

From the construction shown and described it will be seen that a backward and forward movement of the auxiliary truck or carriage A² will impart its motion to the hay fork in a manner to operate the same; and when the carriage A² is thus moved, the rock arms 26 form a swinging fulcrum for the upper ends of the thrust levers 25.

The rod or axle 12 of the auxiliary truck A² is adapted to support the forward end of the hay crane when the same is in its lowermost position, and thereby holds the series of longitudinal tines 17 of said crane slightly above the ground; while the truck itself, being pivotally connected as it is to the lower end of the thrust levers 25, and being provided with wheels for running on the ground, forms, as it were, a guide for the ends of said levers, causing them always to move in an approximately horizontal position, and preventing them from digging into the ground as they would tend to do were it attempted to move them back and forth without guides.

The hay fork A³ is provided with a spring 13ª connected at its upper forward end by the rods 13ᵇ to the forward ends of the side bars 13 of the crane, said spring being connected at its lower end to the bolt 13ᶜ which connects the inner ends of the straps 13ᵈ together. These straps 13ᵈ are secured at their outer ends to the sides 1 of the main truck frame at a point in advance of the pivots 14 at the inner ends of the side bars 13 of the crane, by which arrangement tension is put upon the spring when the crane is elevated to its vertical position, which tension is designed to tip the crane forwardly to start its return movement from that position, which movement is then completed by gravity. The straps 13ᵈ are braced against lateral forward strain by the brace rod 13ᵉ which connects the bolt 13ᶜ with the rear transverse bar 3 of the main truck frame.

The sweep or hay collector B of my device is formed of the diverging side bars 27 braced together near their rear ends by the brace bar 28 from the center of which the seat bar 29 extends rearwardly and passes between the converging ends of the side bars 27 which are rigidly secured to it at this point. The bar 29 projects beyond said converging ends sufficiently to afford room on its projecting portion for a seat 30 which is mounted thereupon for the driver. At its extreme end this projecting bar 29 is provided with a caster wheel 31 and a clevis 32. The head 32 of the sweep is connected to the front ends of the diverging bars 27 by the pivotal connections 33 (Fig. 4), which adapt said head to rock slightly back and forth from the vertical.

To the under side of the head 32 is rigidly secured the series of horizontal tines 34, and to the front side thereof the series of vertical tines 35. The vertical posts 36 are rigidly secured to the rear side of the sweep head 32. The lower ends of these posts carry suitable bearings for the pair of wheels 37 which support the front end of the sweep, while their upper ends are connected together by a bar 38 from the center of which the rod 39 extends rearwardly and pivotally engages the rear end of the foot-lever 40, which lever is pivoted near its front end to the seat-bar 29, and is adapted through the rod 39 to rock the head of the sweep to raise or lower the points of the tines 34, as illustrated in Fig. 5; and since the pivot point 41 at the rear end of the lever 40 is adapted to be depressed below the horizontal plane of the pivot point 42 at the forward end of said lever, it follows that when the heel of the foot-lever is depressed to its lowest position as in Fig. 3, it will remain locked, as it were, in that position; and with the connections shown will hold the points of the sweep tines 34 in their uppermost position, which is the position they should occupy at all times when not collecting hay from the field. The sweep is provided near its rear ends with a pair of double-trees 43 to which the horses are to be hitched; and forwardly of the double-trees are the links 44 and the eye-bolts 45, to either of which the heads of the horses may be suitably secured to keep them from turning outwardly from the sides of the sweep.

The operation of my device is as follows:—The rear end of the elevator A is placed close to the stack bottom, with the front end facing toward the portion of the field from which the hay is to be collected, and the truck 6 is securely fastened to the ground by means of the pin 8 passed through the eye bolt 7 and driven into the earth. Hay is collected from the field by the sweep in the usual manner, the tines 34 being dropped to their lowermost position as shown in full lines in Fig. 5 while it is being collected, and then elevated to the position shown in Fig. 3 when the hay is conveyed to the elevator. The series of tines 17 of the hay crane occupy a slightly higher horizontal position than the horizontal position of the tines 34 of the sweep, so that when they meet the latter will pass under the former without contacting therewith. When the sweep has conveyed its load of hay to the elevator with the tines 17 of the fork overlapping the tines 34 of the sweep, the head 32 of the sweep will abut against the forward ends of the side bars 9 of the auxiliary truck or carriage A², and as the sweep advances this carriage will move backwardly toward the axle 4 of the rear truck A, which through the thrust bar or lever 25 fulcrumed in the upper end of the fulcrum link or rock arm 26, the thrust bar 24, the rock shaft 22 rocking on the rock arms 21, and the tension links 23, will elevate the crane to its vertical position, (as shown in Fig. 2,) and will dump the hay therefrom. When the fork has reached its vertical position the tension that has been imposed on the spring 13ᵃ will tend to tilt it forwardly again to start its return movement, which after it is started by the spring is completed by gravity, and the horses are simply backed slowly to keep the crane from descending to its horizontal position too rapidly. That is, as the horses back the operating mechanism of the elevator follows the sweep. The series of pivoted dumping tines 18 are adjusted by means of the adjusting braces 20 to hasten or retard the dumping of the hay, while the series of vertical tines 35 of the sweep serve to force the hay, delivered by the sweep, well onto the tines 17 of the crane in a compact mass, so that large bunches may be handled each time by the crane. These vertical tines 35 of the sweep also enable the sweep to collect larger and more compact loads or bunches of hay than would be possible without them. When a stack is finished and it is desired to move the elevator to some other part of the field, the pin 8 is withdrawn from the ground and the link 6 is hitched to the rear end of the sweep as illustrated in Fig. 4. The elevator is sufficiently light and is so mounted on its trucks that it can be moved around the stack from one side to the other, by hand, whenever it is desirable to thus move it.

From the foregoing it will be seen that my elevator is not entirely dependent upon the sweep but may be operated by anything which will engage the front truck and push it rearwardly. The operation of the elevator may be made as easy as desired (so easy that it can be performed by hand) by arranging the operating mechanism to increase the distance traversed by the operating truck.

So far as I am aware, all hay stackers now in use employing a pivoted fork require, in addition to the operation of delivering the hay to the fork, another operation to elevate the fork, which operation is effected by means of ropes and pulleys; hence it will be seen that my invention not only dispenses with ropes and pulleys which are so objectionable and expensive on this kind of machinery, but also dispenses with the extra operation heretofore employed to operate the fork. With my invention, one man on the stack, and one man and team with the sweep is all that is necessary to expeditiously build a stack of hay. For rapid work there should be two sweeps for each elevator.

Having thus described my invention, what I claim as new and desire to protect by Letters Patent is:—

1. In hay stackers, the combination with a pivoted fork, of operating mechanism connected therewith, said mechanism having a portion thereof supported on a carriage adjacent the head of the fork and adapted to move toward the fork to elevate the fork and from the fork to lower it.

2. In hay stackers, a pivoted fork and coöperating mechanism connected therewith, said mechanism having a horizontally movable portion adapted to be moved toward the fork to elevate the fork and from the fork to lower it; and means for guiding said portion in its horizontal movements.

3. In hay stackers, a pivoted fork; means for supporting the fork in a stationary position when at work; and operating mechanism connected with the fork, said mechanism having a portion independent of the fork-supporting means adapted to rest upon the ground and to move thereupon alternately toward and from the fork to respectively raise and lower the fork.

4. In hay stackers, the combination with a pivoted fork, of operating mechanism connected therewith; and means adapting said operating mechanism to be contacted with by a hay carrier upon the near approach of said carrier to the fork, said mechanism being also adapted, after said contact, to be operated by the further movement of the carrier toward the fork, to elevate the fork.

5. In a hay stacker, the combination with a reciprocating fork having operating mechanism connected therewith, of a sweep adapted to collect the hay and convey it to said fork, said coöperating mechanism being adapted to be engaged and operated, by the movement of the sweep toward the fork, to elevate the fork.

6. In hay stackers, a reciprocating fork; a portable support therefor; and operating mechanism connected with the fork; said mechanism having a portion adapted to move backward and forward on the ground to operate the fork; and a sweep adapted to collect the hay and convey it to the fork, and to come into abutting engagement with said movable part of said mechanism to move the same toward the fork to elevate the fork, and to move from the fork to permit the fork to descend by gravity.

7. In hay stackers, a hay elevator comprising a portable supporting frame formed in two sections, one of said sections being adapted to be secured in rigid position when at work and the other section being adapted to move backwardly and forwardly toward and from relatively to the rigid section; a reciprocating fork mounted on said rigid section; and operating mechanism for the fork, said mechanism being interposed between the fork and the movable part of the supporting frame and adapted to transmit the backward and forward motion of said movable part of the frame to the fork to operate the same, said movement toward the fork being adapted to elevate the fork, and said movement from the fork being adapted to cause it to descend.

8. In hay stackers, a hay elevator comprising a portable supporting frame formed in two separate sections, one of said sections being adapted to be secured in rigid position when at work, and the other section being adapted to be moved backwardly and forwardly relatively to the rigid section; a reciprocating fork mounted on said rigid section; and a series of levers interposed between the fork and the movable part of the supporting frame and adapted to transmit the backward and forward motion of said movable part of the frame to the fork to operate the same.

9. A hay stacker, comprising a portable supporting frame formed in two separate sections, one of said sections being adapted to be stationary when at work and the other section being adapted to be moved backwardly and forwardly relatively to the stationary section; a reciprocating fork mounted on said rigid section; operative mechanism for the fork, said mechanism being interposed between the fork and the movable part of the supporting frame, and adapted to transmit the backward and forward motion of said movable part of the frame to the fork to operate the same; and a sweep for gathering hay from the field and conveying it to the hay fork, said sweep being adapted to abut against the movable part of the frame and to move the same backwardly toward the fork to elevate the fork.

10. A hay stacker comprising a portable supporting frame formed in two sections, one of said sections being adapted to be stationary when at work and the other section being adapted to be moved backward and forward relatively to the stationary section; a hay elevator mounted on the stationary section and provided at its outer end with a fork; operating mechanism for the elevator, said mechanism being interposed between the elevator and the movable part of the supporting frame and adapted to transmit the backward and forward motion of said frame to the elevator to operate the same; and a sweep adapted to collect the hay from the field and convey it to the elevator, said sweep having a fork adapted to coöperate with the fork of the elevator to deliver hay thereto in position to be elevated, said sweep being also adapted when in coöperative relation to the fork of the elevator to engage the movable section of the supporting frame to move the same backwardly toward the fork and thereby operate the fork to elevate the hay from the sweep to the stack.

11. In hay stackers, the combination with a reciprocating fork, normally disposed in an approximately horizontal position, and pivotally mounted at its rear end and free at its front end to rock up and down on said pivots, of a longitudinal push bar extending forwardly and adapted to move back and forth; and means for utilizing the backward and forward motion of the push bar to reciprocate the fork.

12. In hay stackers, the combination with a reciprocating hay elevator, of reciprocating mechanism therefor including a rock arm adapted to rock when the elevator is operated; and a thrust bar pivotally mounted on said rock arm and extending forwardly therefrom and adapted to be engaged at its forward end and pushed longitudinally backward to rock said arm to raise said elevator.

13. In hay stackers, the combination with a reciprocating fork, of operating mechanism therefor, comprising a plurality of thrust bars pivotally connected together, one in advance of the other; and rock arms through which said thrust bars reciprocate the fork, said bars at their rear ends being mounted on said rock arms; the forward one of said thrust bars being adapted at its front end to receive an operating thrust from a traveling hay carrier, and through its pivotal connection with the thrust bar to the rear of it also adapted to communicate the thrust to said bar; whereby to operate the fork.

14. In operating mechanism for a reciprocating hay fork, the combination with the rock arm 21, of the thrust bar 24 pivotally mounted at its rear end upon said rock arm; the rock arm 26 pivoted to the arm 21 between its ends; and the thrust bar 25 pivotally mounted at its rear end upon the upper end of the rock arm 26 to rock thereupon, and pivoted between its ends to the forward end of said thrust bar 24.

15. In operating mechanism for a reciprocating hay fork, the thrust bar 25; the thrust bar 24 pivotally connected thereto; the rock arms 26 and 21 upon which the rear ends of the thrust bars 25 and 24 are respectively mounted to rock; and means connecting the fork with the rock arm 21 to be reciprocated thereby.

16. In hay stackers, the combination with a pivoted fork, of a thrust bar adapted to be engaged by a hay carrier and moved backwardly thereby; and means for communicating the backward motion of said thrust bar to the fork to elevate the fork.

17. In hay stackers, the combination with a reciprocating fork, normally disposed in an approximately horizontal position, and pivotally mounted at its rear end and free at its front end to rock up and down on said pivots, of a longitudinal push bar extending forwardly at an angle to the horizontal and adapted to move back and forth; and means interposed between said push bar and the fork for communicating the backward and forward motion of the push bar to the fork to respectively raise and lower the fork.

18. In hay stackers, the combination with a reciprocating fork normally disposed in a horizontal position, and pivotally mounted at its rear end and free at its front end to rock up and down on said pivots, of a longitudinal push bar extending forwardly and adapted to be pushed rearwardly; and means for utilizing the rearward pushing of said bar to elevate the fork.

19. In hay stackers, the combination with a pivoted fork of a carriage adapted to move horizontally toward and from the fork; and operating mechanism for the fork, connected at one end with the fork and at the other end with said horizontally movable carriage, said operating mechanism being adapted to utilize the horizontal movement of the carriage toward the fork, to elevate the fork, and the movement from the fork to lower it.

20. In hay stackers, the combination with a pivoted fork, of operating mechanism therefor having a portion adapted to move toward and from the fork in a horizontal direction to raise and lower the fork respectively; and means for guiding said portion in its horizontal movements.

21. In hay stackers, the combination with a pivoted fork of a member adapted to be engaged by a hay carrier, and to move therewith horizontally back and forth to operate the fork; and operating connections between said member and the fork, said member and each of said connections being rigid.

In testimony whereof I affix my signature in presence of two witnesses.

JOHN HOWARD.

Witnesses:
ANTHONY J. RUDDY,
F. D. WILLIAMS.

Copies of this patent may be obtained for five cents each, by addressing the "Commissioner of Patents, Washington, D. C."